US008396506B2

(12) United States Patent
Sheikh et al.

(10) Patent No.: US 8,396,506 B2
(45) Date of Patent: Mar. 12, 2013

(54) SYSTEM AND METHOD FOR PERFORMANCE ENHANCEMENT IN HETEROGENEOUS WIRELESS ACCESS NETWORKS

(75) Inventors: Khurram P. Sheikh, San Clemente, CA (US); Shankar Venkatraman, Irvine, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 0 days.

(21) Appl. No.: 13/077,556

(22) Filed: Mar. 31, 2011

(65) Prior Publication Data

US 2011/0244853 A1 Oct. 6, 2011

Related U.S. Application Data

(60) Provisional application No. 61/320,658, filed on Apr. 2, 2010.

(51) Int. Cl.
*H04B 7/00* (2006.01)
*H04W 24/00* (2009.01)

(52) U.S. Cl. ............... 455/522; 455/423; 455/452.1

(58) Field of Classification Search ............ 455/522, 455/452.1, 452.2, 423, 446, 418; 370/252, 370/335; 333/136

See application file for complete search history.

(56) References Cited

U.S. PATENT DOCUMENTS

| 6,411,817 | B1 * | 6/2002 | Cheng et al. ............ 455/522 |
| 6,587,690 | B1 | 7/2003 | Di Huo et al. |
| 6,690,939 | B1 | 2/2004 | Jonsson et al. |
| RE41,936 | E | 11/2010 | Woodhead et al. |
| 2002/0094833 | A1 | 7/2002 | Lieshout et al. |
| 2005/0136961 | A1 * | 6/2005 | Simonsson et al. ......... 455/522 |
| 2007/0042798 | A1 | 2/2007 | Chen et al. |
| 2008/0186107 | A1 * | 8/2008 | Rhodes et al. ............ 333/136 |
| 2008/0214196 | A1 | 9/2008 | Sambhwani et al. |
| 2008/0252522 | A1 | 10/2008 | Asbridge |
| 2009/0080349 | A1 | 3/2009 | Rofougaran |

(Continued)

FOREIGN PATENT DOCUMENTS

| WO | 2009/061106 A2 | 5/2009 |
| WO | 2009/134180 A1 | 11/2009 |

(Continued)

OTHER PUBLICATIONS

International Search Report and Written Opinion for International Application No. PCT/US2011/030807 dated Jun. 13, 2011, 9 pages.

(Continued)

*Primary Examiner* — Kiet Doan
(74) *Attorney, Agent, or Firm* — OC Patent Law Group

(57) ABSTRACT

A system and method for dynamically optimizing the transmission power levels for downlink voice and data signal transmitted from a base station to user equipment is disclosed. The user equipment measures the strength and quality of the downlink signal, and transmits this downlink signal information to a control unit. The control unit analyzes the downlink information and employs an adaptive self-learning traffic algorithm which determines optimized power levels for the downlink signals. The control unit may optimize only one carrier signal or a subset of the multi-carrier signals in a preferred embodiment. The values of the optimized power levels are sent to the base station which then increases or decreases the downlink transmission power of one or more carrier signals based on this level. As a result, the area associated with dead spots is reduced and the quality of the downlink signals is enhanced.

14 Claims, 5 Drawing Sheets

U.S. PATENT DOCUMENTS

2010/0080137 A1* 4/2010 Vedantham et al. .......... 370/252
2010/0202392 A1 8/2010 Zhang et al.
2011/0244914 A1 10/2011 Venkatraman et al.
2012/0196611 A1 8/2012 Venkatraman et al.

FOREIGN PATENT DOCUMENTS

WO 2009/134200 A1 11/2009

OTHER PUBLICATIONS

International Preliminary Report on Patentability from Application No. PCT/US2011/030807 dated Oct. 11, 2012, 8 pages.
International Search Report and Written Opinion pertaining to International Application No. PCT/US2012/032184 dated Jul. 10, 2012.

* cited by examiner

SYSTEM AND METHOD FOR PERFORMANCE ENHANCEMENT IN HETEROGENEOUS WIRELESS ACCESS NETWORKS

RELATED APPLICATION INFORMATION

The present application claims priority under 35 U.S.C. Section 119(e) to U.S. Provisional Patent Application Ser. No. 61/320,658 filed Apr. 2, 2010, the disclosure of which is incorporated herein by reference in its entirety.

BACKGROUND OF THE INVENTION

1. Field of the Invention

The present invention relates generally to methods and systems related to wireless telephony. More particularly, the invention relates to multiple carrier wireless systems communicating both voice and data signals and related methods.

2. Description of the Prior Art and Related Background Information

Modern wireless telephone systems often support multiple telecommunications standards and provide multiple carrier signals to users within a cell region. Each of these carrier signals may have differing coverage areas which must be optimized to enhance the network capacity. However, conventional wireless systems do not optimize cell capacity based on the real-time requirements of the users within the cell region.

Accordingly, a need exists to optimize the performance of multiple carrier wireless systems.

SUMMARY OF THE INVENTION

In the first aspect, the present invention provides a method for optimizing downlink transmission power of a wireless base station. The method comprises transmitting downlink signals having a first power level from a base station to a plurality of User Equipment (UEs), and collecting information describing the downlink signals reported by the plurality of UEs. The method further comprises determining when a downlink transmission power of the base station should be updated based on the collected information and transmitting downlink signals having a second power level from the base station to the plurality of UEs.

In a preferred embodiment of the method for optimizing downlink transmission power of a wireless base station, collecting information describing the downlink signals reported by the plurality of UEs further comprises collecting signal strengths of the downlink signals reported by the plurality of UEs, collecting interference measures reported by the plurality of UEs, and, collecting downlink data rates of the downlink signals reported by the plurality of UEs. Determining when a downlink transmission power of the base station should be updated preferably comprises determining a number of UEs located near a cell edge of the base station. Determining a number of UEs that are located near a cell edge of the base station preferably further comprises determining a number of UEs that are located near a cell edge of the base station based on the signal strengths of the downlink signals reported by the plurality of UEs. The method preferably further comprises calculating an average signal strength value of the signal strengths of the downlink signals reported by the UEs located near the cell edge, and calculating an average downlink data rate value of the downlink data rates of the downlink signals reported by the UEs located near the cell edge. Determining when a downlink transmission power of the base station should be updated preferably further comprises determining whether the number of UEs located near the cell edge is greater than a first threshold. The method preferably further comprises calculating a downlink rate improvement based on the average downlink data rate value and an average downlink data rate value for a power level employed immediately prior to the first power level. Determining when a downlink transmission power of the base station should be updated preferably further comprises comparing the downlink data rate improvement to a second threshold value. Determining when a downlink transmission power of the base station should be updated preferably further comprises determining whether an additional increase in downlink transmission power of the base station would exceed a maximum power of the base station. Determining when a downlink transmission power of the base station should be updated preferably further comprises collecting signal strengths of the downlink signals reported by UEs located in neighboring cells, calculating an average signal strength in neighboring cells based on the signal strengths of the downlink signals reported by the UEs located in neighboring cells, and comparing the average signal strength in neighboring cells to a third threshold. The method preferably further comprises determining a second power level based on the collected information. The method preferably further comprises adjusting an antenna downtilt and azimuth using a lookup table.

In another aspect, the present invention provides a method for optimizing the downlink transmission power of a wireless base station. The method comprises providing at least first and second separate carrier signals having respective first power levels from a base station to a plurality of User Equipment (UEs), collecting information describing the first and second separate carrier signals reported to the base station by the plurality of UEs, and determining when the transmission power of the first separate carrier signals should be updated based on the collected information. The method further comprises providing said first separate carrier signals from the base station to the plurality of UEs having a second power level and transmitting the second separate carrier signals at said first power level.

In a preferred embodiment, the first carrier signals comprise a data signal. The second carrier signals preferably comprise a voice signal. Collecting information describing the first and second separate carrier signals reported to the base station by the plurality of UEs preferably further comprises collecting signal strengths of the first and second separate carrier signals reported by the plurality of UEs, collecting interference measures reported by the plurality of UEs, and collecting downlink data rates of the first and second separate carrier signals reported by the plurality of UEs. Determining when the transmission power of the first separate carrier signals should be updated preferably further comprises determining a number of UEs located near a cell edge of the base station.

In another aspect, the present invention provides a wireless system having a base station providing multi-carrier communication signals, a plurality of User Equipment (UEs) receiving the multi-carrier communication signals, wherein the UEs are configured for collecting and transmitting information describing the multi-carrier communication signals, and a control unit configured for receiving the information describing the multi-carrier communication signals, calculating optimized values of power levels of each carrier communication signal of the multi-carrier communication signals, and transmitting the values of the power levels to the base station. The base station is further configured for transmitting the multi-carrier signals each having power levels based on the values of the power levels calculated by the control unit.

In a preferred embodiment, the wireless system further comprises a network, wherein the base station is communicatively coupled to the control unit via the network. The wireless system preferably further comprises a second base station, wherein the control unit is further configured for providing power levels for multi-carrier signals transmitted by the second base station. The control unit is preferably configured for providing uniform coverage for the cell of the base station and the cell of the second base station.

Further features and aspects of the invention are set out in the following detailed description.

DETAILED DESCRIPTION OF THE INVENTION

It is an object of the present invention to provide a system and methods for dynamically optimizing the transmission power levels for downlink voice and data signal transmitted from a base station to user equipment such as cellular telephones or smart phones which support both voice and data. The user equipment measures the strength and quality of the downlink signal, and transmits this downlink signal information to a control unit such as a remote infrastructure control center. The control unit analyzes the downlink information and employs an adaptive self-learning traffic algorithm which determines optimized power levels for the downlink signals. The control unit may optimize only one carrier signal or a subset of the multi-carrier signals in a preferred embodiment. The values of the optimized power levels are sent to the base station which then increases or decreases the downlink output transmission power of the multi-carrier power amplifier for one or more carrier signals appropriately. As a result, the cell capacity of the base station is enhanced.

Modern mobile communications networks require enhanced efficiency and performance. These goals may be attained by increasing network capacity during peak usage hours, enhancing the data rates for mobile data devices while maintaining signal quality and network coverage, and reducing harmful interference to neighboring base stations. Modern smart phones transmit and receive both voice signals and data signals which place additional demands on the wireless systems and require improved signal quality, enhanced available user capacity, and enhanced overall coverage area as demanded by dynamically changing wireless traffic. Moreover, technological advances and the evolution of communication standards place further demands on wireless service providers as the communication medium rapidly transitions from voice to on-demand data.

To address the aforementioned challenges, an Integrated Power Boost (IPB) system and method provide operational performance advantages and lower cost over conventional wireless cell site designs by optimizing wireless service provider cell site performance. Under heavy wireless traffic, the present system and method can improve average cell site capacity by 10-14% depending on cell site spacing. Further increases in cell site edge data rate and signal coverage is enhanced by 15-35% by improving SINR ("Signal to Interference and Noise Ratio") for cell edge users otherwise not achievable with conventional solutions. Another benefit of the IPB system includes the consolidation of radio frequency (RF) feedlines, which creates space on existing towers or support structures for streamlined long term evolution ("LTE") implementation and restores receiver (Rx) diversity capability previously lost due to RF feedline absence.

Figure 1:
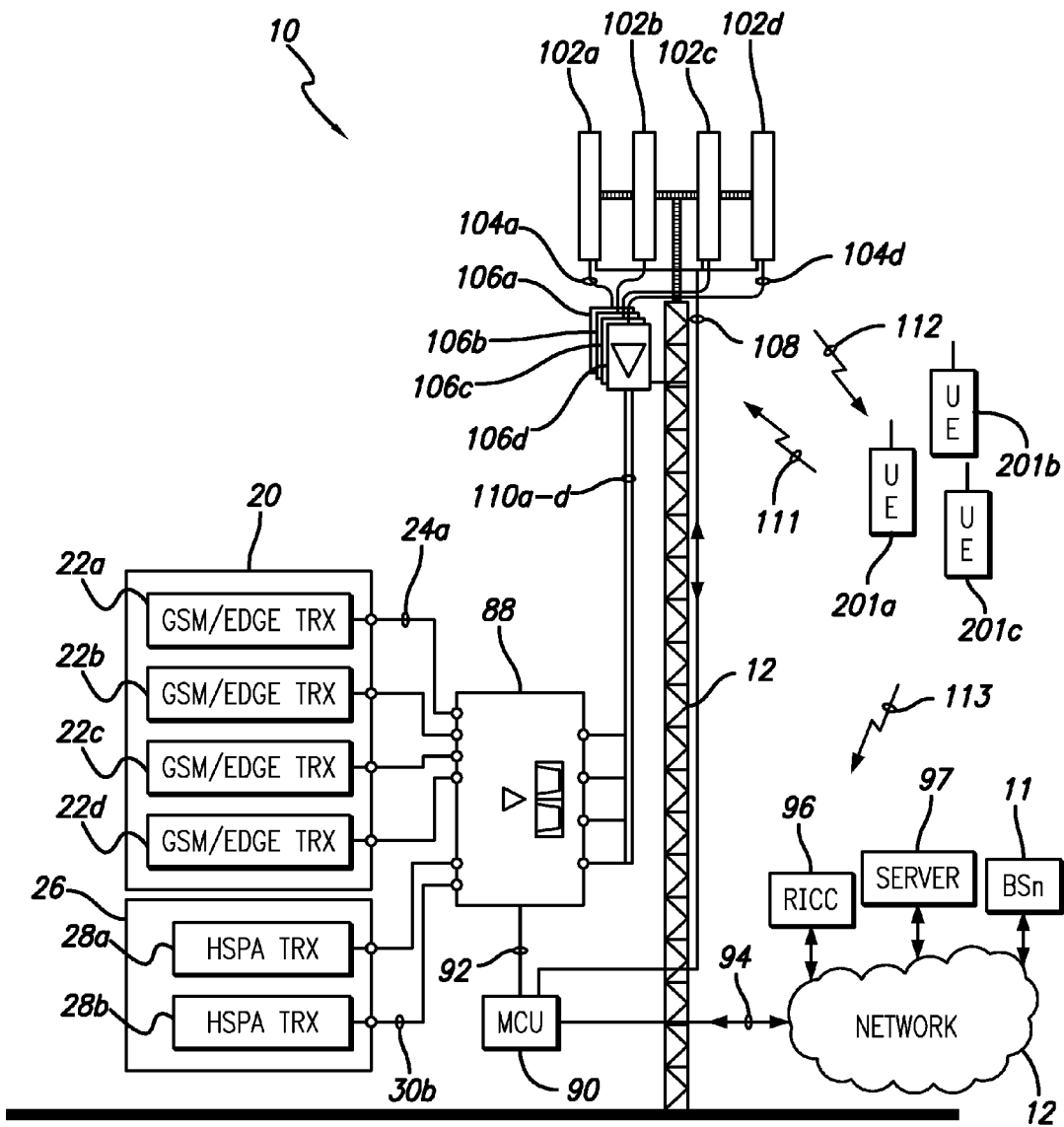
FIG. 1A is a block schematic drawing of a base station communicating voice and data to User Equipment in accordance with the present invention.

FIG. 1A is a block schematic drawing of a base station 10 communicating voice and data to mobile wireless devices or UEs ("User Equipment") 201a-201c in accordance with the present invention. The base station 10 comprises a first transceiver subsystem 20 and a second transceiver subsystem 26. The first transceiver subsystem 20 may be a 2G or 2.5G subsystem in an embodiment. The second transceiver 26 may be a 3G or 4G transceiver subsystem in an embodiment. For example, the first transceiver subsystem 20 may comprise GSM/EDGE ("Global System for Mobile communications/Enhanced Data rates for GSM Evolution") cards 22a-22d. The second transceiver subsystem 26 may comprise HSPA TRX ("High Speed Packet Access Transceiver") cards 28a and 28b. RF interfaces 24a- 24d electrically couple the GSM/EDGE cards 22a- 22d to the multi-carrier power amplifier duplexing system 88. RF interfaces 30a -30b electrically couple the HSPA/TRX cards 28a and 28b to the multi-carrier power amplifier duplexing system 88.

The multi-carrier power amplifier duplexing system 88 is coupled via control interface 92 to the master control unit 90 which receives commands from a control unit such as the RICO 96 ("Remote Infrastructure Control Center") or the server 97 via the network interface 94. Other base stations 11 (illustrated generally as "n" in number by BSn) are in communication with the network 12 and may be controlled by RICO 96 or server 97 as well. The antennas 102a-102d and the amplifiers 106a-106d may be mounted on tower 12. The multi-carrier power amplifier duplexing system 88 is electrically coupled to the amplifiers 106a-106d via the cable runs 110a-110d. The amplifiers 106a -106d are coupled to the base station antennas 102a-102d via cables 104a-104d. The base station antennas 102a-102d are electrically coupled to the master control unit 90 via the AISG ("Antenna Interface Standards Group") control interface 108. The base station antennas 102a-102b transmit signals to the UEs 201a-201c through the downlink RF transmission 112 and receive signals from the UEs 201a-201c through the uplink RF transmission 111. Implementation of the IPB involves UEs 201a-201c in communication with a base station 10 for determining quality of a downlink transmission 112 parametric matrixes. UEs 201a-201c receive and analyze downlink transmission 112 from the host base station 10 by analyzing multiple parameters associated with downlink transmission 112 channel. Generally stated, in one embodiment, if a certain number of UEs determines that the signal strength, for example, of the pilot or setup channel transmitted by a host base station 10 exceeds or falls below a particular threshold or detection criteria, the UEs will provide an aggregated downlink transmission measurement data 113 back to a control unit such as the RICO ("Remote Infrastructure Control Center") 96, the server 97, or the master control unit 90. The control unit will determine if IPB operational settings should be changed. Simultaneously, or alternatively, the base station transceivers 20 and 26 being in communication with UEs 201a-201c are adapted to provide quality of an uplink transmission 111 parametric matrixes. As required, base station transceivers 20 and 26 provide uplink transmission parametric matrixes back to the RICO 96. Based on adaptive self learning traffic enhancement algorithm, among other criteria, the RICO 96 may increase or decrease output power available from the multi-carrier power amplifier 88, or increase or decrease gain in amplifier 106a-106d, or change down tilt angle or azimuth beam heading of the base station antennas 102a-102d, or in combination with other operational aspects to maintain overall system performance. Unlike prior system implementations, performance related elements are remotely accessible and controllable.

Additional benefits of the IPB system and methods include the elimination of passive carrier combining which restores power per carrier for both GSM/EDGE and UMTS ("Universal Mobile Telecommunications Systems") systems through use of the multi-carrier power amplifier 88 for downlink signal amplification.

Therefore, embodiments of the present invention provide an IPB system and method that avoids the above mentioned limitations while providing a means for enhanced wireless service that does not burden service providers with expensive and bulky equipment.

Figure 2A:
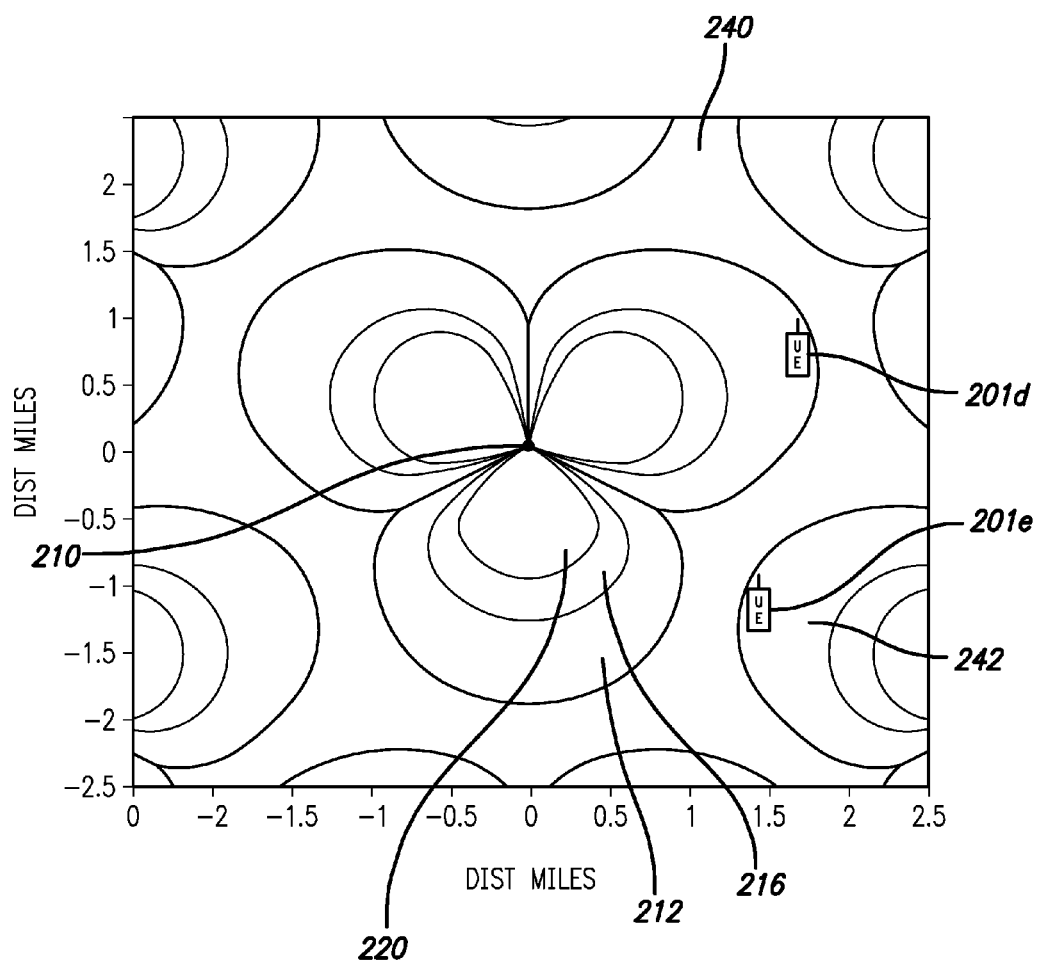
FIG. 2A is a representation of simulated radiation patterns from a base station for various downlink signal frequencies.

FIG. 2A is a representation of simulated radiation patterns for antenna 210 for various downlink signals before an IPB is applied. The innermost radiation pattern 220 represents the coverage area for downlink signals having a data capacity of 1.2 Mbps ("Megabit per second"), the middle radiation 216 represents the coverage area for downlink signals having a data capacity of 0.8 Mbps, and the outermost radiation pattern 212 represents the coverage area for downlink signals having a data capacity of 450 kbps ("kilobits per second"). The coverage area for antenna 210 does not extend to adjacent cell coverage areas 242 and therefore UEs will not have reception in dead spots 240. UE 201d represents user equipment that is located at or near the cell edge for antenna 210. UE 201e represents user equipment that is located at a neighboring cell region 242.

Figure 2B:
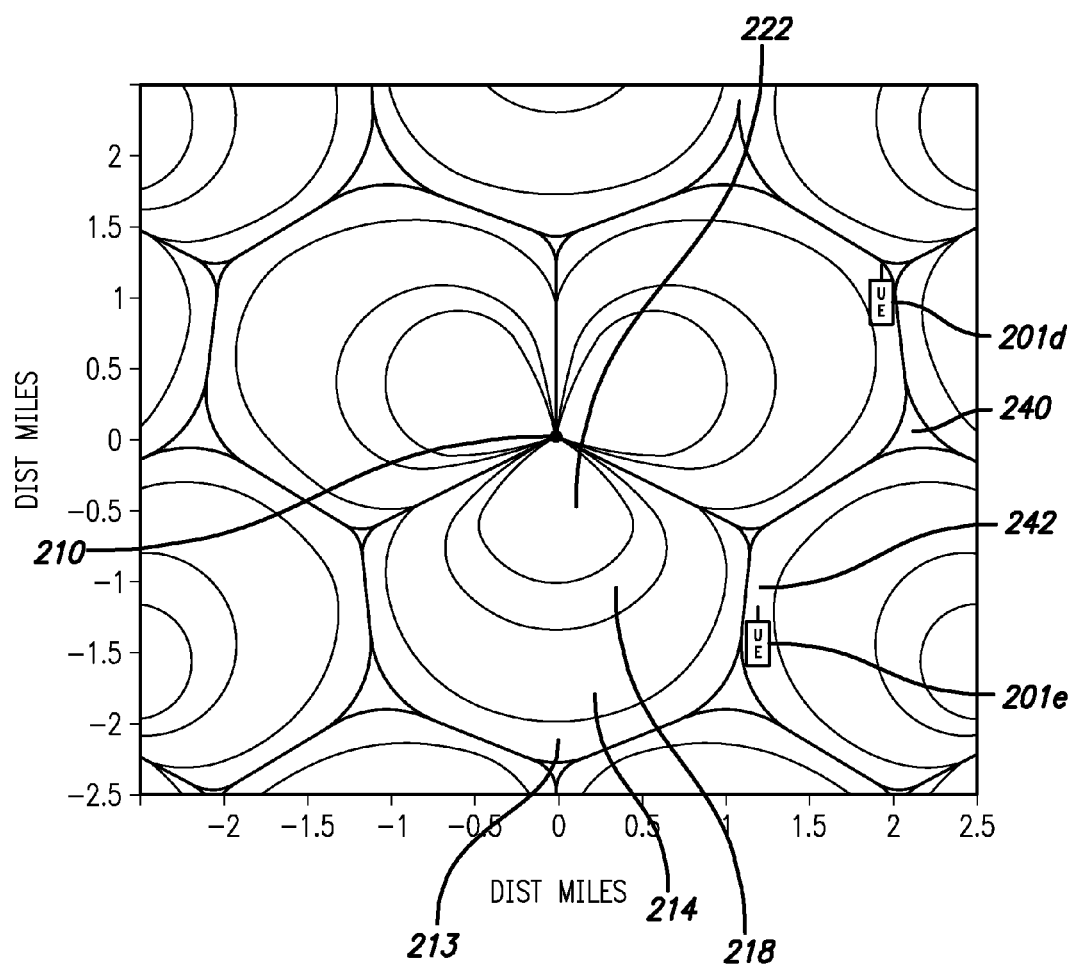
FIG. 2B is a representation of simulated radiation patterns from a base station in which the power levels for the downlink signals have been optimized.

FIG. 2B is a representation of simulated radiation patterns for the base station 10 in which the power levels of the downlink signals have been increased. The innermost radiation pattern 222 represents the coverage area for downlink signals having a data capacity of 1.3 Mbps, the next radiation pattern 218 represents the coverage area for downlink signals having a data capacity of 1.0 Mbps, the next radiation pattern 214 represents the coverage area for downlink signals having a data capacity of 600 kbps, and the outermost radiation pattern 213 represents the coverage area for downlink signals having a data capacity of 300 kbps. After the IPB is applied, the coverage area 213 for antenna 210 extends to adjacent cell coverage area 242 such that the area associated with dead spots 240 is substantially reduced.

Figure 3:
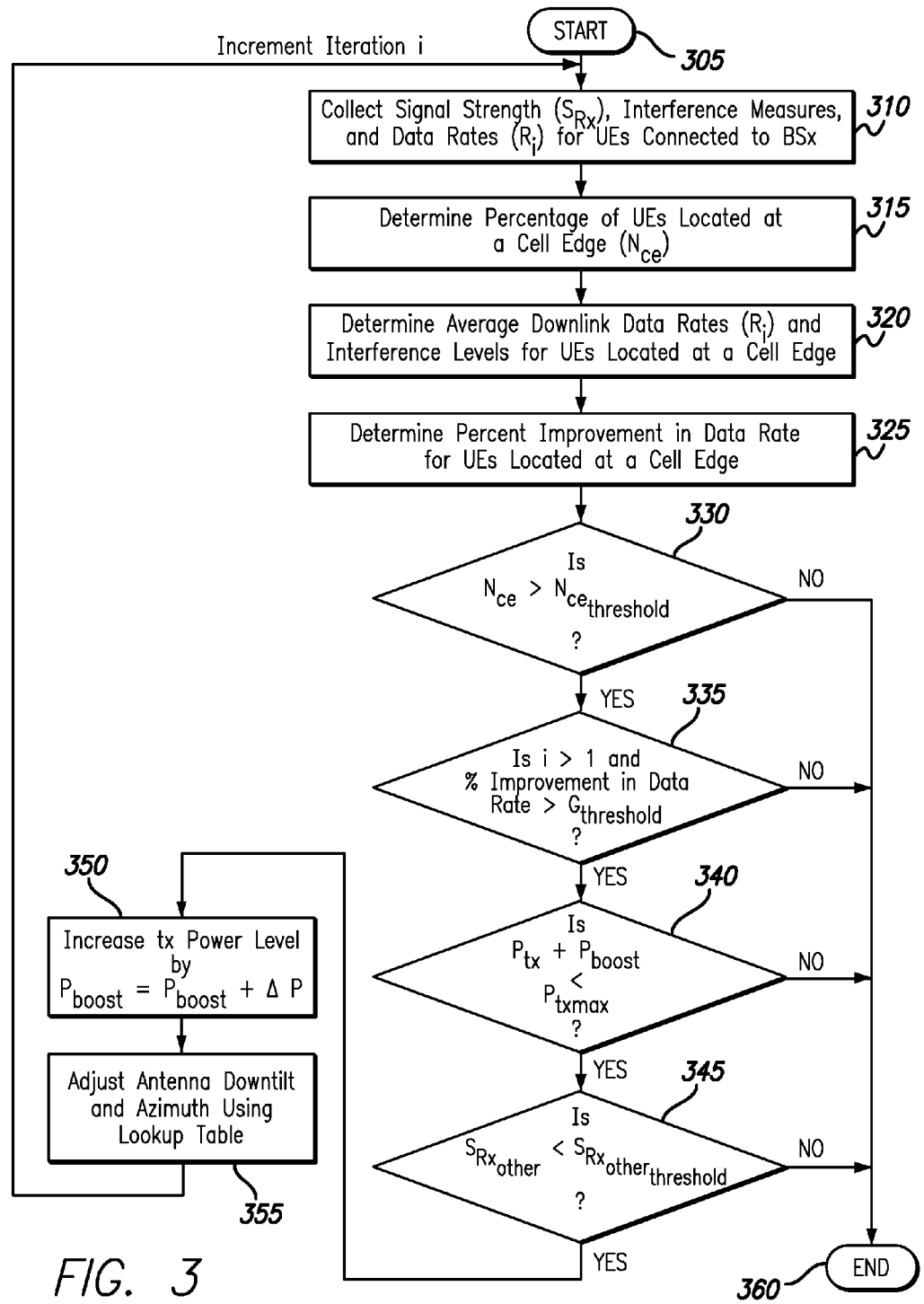
FIG. 3 is a flow chart illustrating an exemplary process for optimizing the power levels of downlink transmission signals.

FIG. 3 is a flow chart illustrating an exemplary process to optimize the power level of a downlink transmission signal. The Integrated Power Boost (IPB) extends the functionality of the multi-carrier power amplifier duplexing system 88 to improve the cell coverage and data rates in an automated fashion. The IPB system is capable of determining the transmission power for a carrier based on algorithm executed on a RICC 96 or external server 97 capable of collecting data from one or multiple base stations for statistical analysis.

The process begins at step 305 in which an index counter, "i," is set to the value of 1. The UEs 201a-201e collect and report data on several metrics that are used to provide a measure of current cell coverage and performance (step 310). Among the metrics collected include downlink signal strengths $S_{Rx}$, interference measures, and the data rates $R_i$ as reported by the UEs 201a-201e. The metrics are analyzed in a control unit such as the master control unit 90, the RICC 96, or the server 97 to determine the average number or percentage of UEs which are located at a cell edge 201d ("$N_{ce}$") of the base station 10 based on the strength of the downlink signals (step 315). UEs such as UE 201d shown in FIG. 2A having a downlink signal strength below a predefined threshold $S_{RX\_threshold}$ are classified as being located at a cell edge. The average values for $N_{ce}$, interference levels, and the R for the UEs are determined based on these measurements (step 320). The improvement of the data rate for the UEs located near a cell edge compared to the data rate from the previous iteration is calculated as a percentage, such that the percent improvement is given by the relation $(R_i-R_{i-1})/R_{i-1}$ (step 325).

The power level for one or more carrier signals is then optimized based on one or more criterion. The nonlimiting criteria expressed in steps 330-345 are for illustration purposes only. It shall be understood that one or more of the criterion may be employed and other criterion can be used to optimize the coverage area.

One criterion may consider whether the number or percentage of UEs ("$N_{ce}$") located near a cell edge, such as UE 201d is greater than preset threshold $N_{ce\_thresh}$ such that $N_{ce}> N_{ce\_threshold}$ (step 330). If the number of UEs located near a cell edge $N_{ce}$ exceeds the threshold $N_{ce\_threshold}$, the process continues. Otherwise, the process terminates at step 360.

Another criterion may consider, where the index counter i is greater than 1, whether the percent improvement in data rate for UEs located near a cell edge 201d is greater than a pre-defined threshold $G_{threshold}$ (step 335). If the criterion is met, the process continues. Otherwise, the process terminates to step 360.

Another criterion may consider whether the sum of current downlink transmission power ("$P_{tx}$") and the additional power that would be increased ("$P_{boost}$") is less than a maximum power level ("$P_{txmax}$") assigned to the base station 10 (step 340). If the criterion is met, the process continues. Otherwise, the process terminates to step 360.

Figure 4:
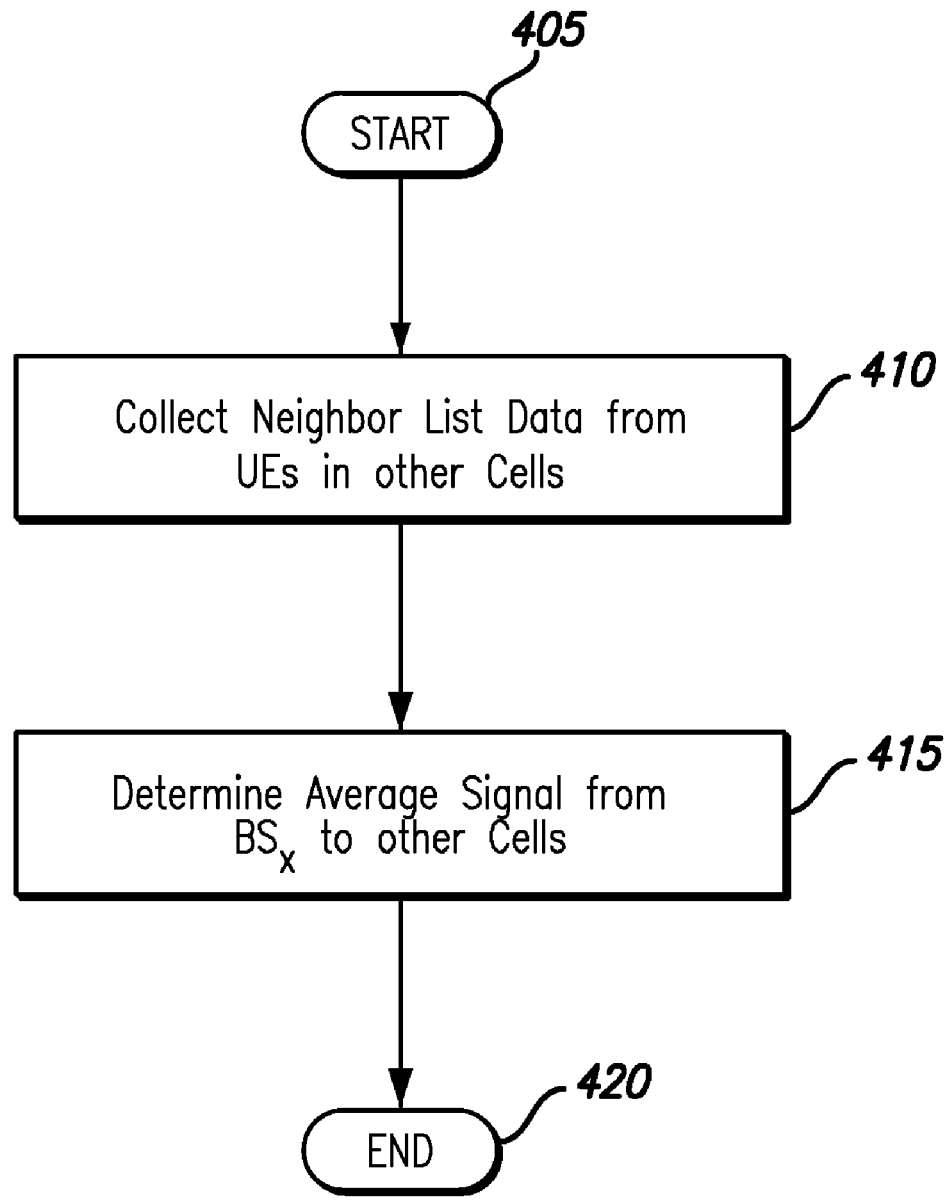
FIG. 4 is a flow chart illustrating an exemplary process to determine the downlink signal strength from a base station to User Equipment in neighboring cells.

Another criterion may consider whether the downlink signal strength $S_{rx}$ of UEs in neighboring cells such as UE 201e is less than the preconfigured threshold $S_{rx\_other\_thresh}$ (step 345). If the criterion is met, the process continues. Otherwise, the process terminates to step 345. FIG. 4 is a flow chart illustrating an exemplary process to determine the downlink signal strength for UEs in neighboring Cells. The process begins at step 405. Neighborhood list data is collected from neighboring cells that report reception of signals from the base station 10 (step 410). The average signal from the UEs in the neighboring cell is determined to provide the value for $S_{rxother}$.

If one or more of these conditions in steps 330, 335, 340, and 345 is met, the downlink transmission power of the base station 10 is increased by an amount of ΔP (step 350). In one embodiment where a single carrier is employed, the power boost is simply applied to that carrier. In another embodiment, the base station 10 provides a plurality of separate carrier signals from the base station 10 to a plurality of UEs 201a-201c. The control unit such as RICC 96 or server 97 preferably determines whether the transmission power of a single carrier signal of the separate signal carrier signals should be updated based on the information describing the separate carrier signals. This separate single carrier may be a data signal or a voice signal but may more typically include a data signal. The RICC 96 or server 97 determines a value of a second power level of the single carrier signal based on the information describing the separate carrier signals. The power boost is then applied to this carrier while the other carrier's or carriers' power is unchanged.

The algorithm may also require that the power level of a single carrier signal or multiple signals be altered at different times. For example, geographic changes in mobile traffic load especially between industrial/office locations and residential locations are common. The IPB system can also be programmed to address the increasing load in certain cells during peak hours by allowing for a pre-defined time-sensitive pattern of $P_{txmax}$ and $S\_{rx\_other\_thresh}$. This would enable a cell to boost power to greater values during busy day hours in a cell while allowing a neighboring cell catering to more residential traffic to have greater Power boost during evenings or weekends. In such applications, optimized values of antenna downtilt or azimuth can improve performance by allowing for higher transmission powers to be used to improve in-building penetration without significant increase in neighbor cell interference. The automated system can be configured throughout the network to respond to pre-determined traffic patterns by increasing power levels to improve capacity and decreasing power to lower values in low utilization periods to reduce interference to a neighboring cell experiencing a burst in traffic.

The antenna downtilt and azimuth may also be changed in association with the transmit power based on a pre-defined look up table designed for specific applications of power boost (step 350). The process then continues to step 310.

The IPB system has several important features and separable implementation embodiments. For example, the IPB algorithm can be employed to optimize the power level of multi-carrier base stations. A typical cellular network consists of base stations supporting multiple carriers and technologies such as 2G, 3G, and 4G which are co-located at the at the same physical site. Differences in carrier frequencies result in reduced coverage for higher frequencies. In addition, 3G and 4G technologies can provide greater data rates due to adaptive modulation and coding as the SINR increases. To address the ever increasing data rate requirements of users, performance of wireless data networks can be improved by using appropriate power levels. The IPB algorithm can be used as a general solution to automatically determine optimal power levels across carriers, technologies, and base stations as a means of improving cell coverage and performance in a multi-carrier network.

In addition to general power optimization, the IPB system can be used to preferentially improve coverage and performance for certain technologies or carriers. Technologies like HSPA deliver higher data rates to users as SINR improves. This IPB system can be designed to preferentially improve HSPA network performance as opposed to the parallel voice network by appropriately using $P_{txmax}$ on a per carrier basis.

The present invention has been described primarily as a system and means for dynamically optimizing the transmission power levels for downlink voice and data signal transmitted from a base station to user equipment such as cellular telephones or smart phones which support both voice and data. In this regard, the system and means for optimizing transmission power levels for downlink voice and data are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for optimizing downlink transmission power of a wireless base station, comprising:
    transmitting downlink signals having a first power level from a base station to a plurality of User Equipment (UEs);
    collecting information describing the downlink signals reported by the plurality of UEs;
    determining when a downlink transmission power of the base station should be updated based on the collected information; and,
    transmitting downlink signals having a second power level from the base station to the plurality of UEs,
    wherein collecting information describing the downlink signals reported by the plurality of UEs further comprises:
    collecting signal strengths of the downlink signals reported by the plurality of UEs;
    collecting interference measures reported by the plurality of UEs; and,
    collecting downlink data rates of the downlink signals reported by the plurality of UEs,
    wherein determining when a downlink transmission power of the base station should be updated further comprises determining a number of UEs located near a cell edge of the base station.

2. The method for optimizing the downlink transmission power of a wireless base station as set out in claim 1, wherein determining a number of UEs that are located near a cell edge of the base station further comprises determining a number of UEs that are located near a cell edge of the base station based on the signal strengths of the downlink signals reported by the plurality of UEs.

3. The method for optimizing the downlink transmission power of a wireless base station as set out in claim 2, further comprising:
    calculating an average signal strength value of the signal strengths of the downlink signals reported by the UEs located near the cell edge; and,
    calculating an average downlink data rate value of the downlink data rates of the downlink signals reported by the UEs located near the cell edge.

4. The method for optimizing the downlink transmission power of a wireless base station as set out in claim 3, wherein determining when a downlink transmission power of the base station should be updated further comprises determining whether the number of UEs located near the cell edge is greater than a first threshold.

5. The method for optimizing the downlink transmission power of a wireless base station as set out in claim 3, further comprising:
    calculating a downlink rate improvement based on the average downlink data rate value and an average downlink data rate value for a power level employed immediately prior to the first power level;
    wherein determining when a downlink transmission power of the base station should be updated further comprises comparing the downlink data rate improvement to a second threshold value.

6. The method for optimizing the downlink transmission power of a wireless base station as set out in claim 3, wherein determining when a downlink transmission power of the base station should be updated further comprises determining whether an additional increase in downlink transmission power of the base station would exceed a maximum power of the base station.

7. The method for optimizing the downlink transmission power of a wireless base station as set out in claim 3, wherein determining when a downlink transmission power of the base station should be updated further comprises:
- collecting signal strengths of the downlink signals reported by UEs located in neighboring cells;
- calculating an average signal strength in neighboring cells based on the signal strengths of the downlink signals reported by the UEs located in neighboring cells; and,
- comparing the average signal strength in neighboring cells to a third threshold.

8. The method for optimizing the downlink transmission power of a wireless base station as set out in claim 1, further comprising determining a second power level based on the collected information.

9. The method for optimizing the downlink transmission power of a base station as set out in claim 1, further comprising adjusting an antenna downtilt and azimuth using a lookup table.

10. A method for optimizing the downlink transmission power of a wireless base station, comprising:
- providing at least first and second separate carrier signals having respective first power levels from a base station to a plurality of User Equipment (UEs);
- collecting information describing the first and second separate carrier signals reported to the base station by the plurality of UEs;
- determining when the transmission power of the first separate carrier signals should be updated based on the collected information; and,
- providing said first separate carrier signals from the base station to the plurality of UEs having a second power level and transmitting the second separate carrier signals at said first power level,
- wherein collecting information describing the first and second separate carrier signals reported to the base station by the plurality of UEs further comprises:
- collecting signal strengths of the first and second separate carrier signals reported by the plurality of UEs;
- collecting interference measures reported by the plurality of UEs; and,
- collecting downlink data rates of the first and second separate carrier signals reported by the plurality of UEs,
- wherein determining when the transmission power of the first separate carrier signals should be updated further comprises determining a number of UEs located near a cell edge of the base station.

11. The method for optimizing the downlink transmission power of a wireless base station as set out in claim 10, wherein the first carrier signals comprise a data signal.

12. The method for optimizing the downlink transmission power of a wireless base station as set out in claim 10, wherein the second carrier signals comprise a voice signal.

13. A wireless system comprising:
- a base station providing multi-carrier communication signals;
- a plurality of User Equipment (U Es) receiving the multi-carrier communication signals, wherein the UEs are configured for collecting and transmitting information describing the multi-carrier communication signals; and,
- control unit configured for receiving the information describing the multi-carrier communication signals, calculating optimized values of power levels of each carrier communication signal of the multi-carrier communication signals, and transmitting the values of the power levels to the base station;
- wherein the base station is further configured for transmitting the multi-carrier signals each having power levels based on the values of the power levels calculated by the control unit,
- further comprising a second base station, wherein the control unit is further configured for providing power levels for multi-carrier signals transmitted by the second base station,
- wherein the control unit is configured for providing uniform coverage for the cell of the base station and the cell of the second base station.

14. The wireless system as set out in claim 13, further comprising a network, wherein the base station is communicatively coupled to the control unit via the network.

* * * * *